United States Patent Office 3,468,811
Patented Sept. 23, 1969

3,468,811
METHOD OF PRODUCING LUMINESCENT ALKALINE EARTH HALOPHOSPHATES
Jan Lourens Ouweltjes, Willem Lambertus Wanmaker, and Dragutin Radielovic, all of Emmasingel, Eindhoven, Netherlands
No Drawing. Filed July 13, 1966, Ser. No. 564,744
Claims priority, application Netherlands, Aug. 30, 1965, 6509868
Int. Cl. C09k 1/36
U.S. Cl. 252—301.4           2 Claims

ABSTRACT OF THE DISCLOSURE

A trivalent antimony activated trivalent alkaline earth halophosphate luminescent material having the apatite structure is prepared by first forming the apatite structure and then heating a mixture of the apatite with antimony oxychloride.

---

The invention in this case relates to an improved method of producing luminescent alkaline earth halophosphates with apatite structure activated with trivalent antimony and, if desired, also with bivalent manganese and to luminescent substances obtained by this method.

The fundamental lattice of these apatites can be represented by the general formula $3M_3(PO_4)_2MX_2$, in which formula M designates at least one of the alkaline earth metals and X designates at least one of the halogens chlorine or fluorine.

Halophosphates of this type are frequently used for converting short-wave ultraviolet radiation into visible radiation, for example, in a gas discharge lamp, more particularly in low-pressure mercury vapor discharge lamps.

When only trivalent antimony is employed as the activator, the luminescent materials emit blue light upon excitation by short-wave ultraviolent radiation. When white light is desired, as in the case of the use of gas discharge lamps for general illumination purposes, besides the trivalent antimony, bivalent manganese is also employed.

In order to further improve the light output, a small quantity of cadmium is sometimes incorporated in the apatite lattice.

Due to the great number of constituents that have to react with each other for the formation of the apatite lattice containing the correct quantity of activator or activators, the process of producing such apatites is extremely difficult to control.

In a known method described in German Patent 1,-409,517, such a luminescent material is prepared by heating a mixture of calcium hydrophosphate, calcium fluoride, calcium carbonate, manganese chloride, manganese carbonate and antimony oxychloride at a temperature of about 1170° C. This method is difficult to control however since the development of water vapor and carbon dioxide during the heating above 500° C. causes antimony trichloride (formed from the antimony oxychloride) to be expelled from the mixture. This makes it very difficult to calculate the amount of ingredients to be employed and makes an adequate system of quality control almost impossible. Further, the loss of antimony results in a decrease of the light output of the luminescent material.

A principal object of our invention therefore is to provide an improved method for the production of antimony activated alkaline earth halophosphate luminescent materials having the apatite structure.

Another object of our invention is to provide an antimony activated alkaline earth halophosphate luminescent material of improved light output.

These and other objects of our invention will be apparent from the description that follows.

According to our invention, we provide the antimony activated apatite lattice by adding the antimony compound only after the apatite structure, which may be activated with manganese, is already formed. By the use of this method there is avoided the loss of antimony due to the expulsion of antimony trichloride by the action of water vapor and carbon dioxide. This permits the practice of a greatly improved quality control and also results in a luminescent material of improved light output. Further, since the loss of antimony is greatly decreased, the cost of the resultant luminescent material is substantially reduced.

In the practice of our invention, the antimony is introduced as antimony oxychloride either as SbOcl or as $Sb_4O_5Cl_2$. In both uses the antimony is in the trivalent form. The apatite structure is produced by heating the necessary substances at a tempterature of about 500° C. to 900° C. for a period of about two to ten hours or longer until the apatite structure is formed. The resultant material is then mixed with the antimony compound and heated at a temperature of about 1000°C.–1300°C. for about two to six hours.

Our invention will now be described more fully with reference to the following example.

A mixture is made of

| | Gms. |
|---|---|
| $CaHPO_4$ | 677.63 |
| $CaCO_3$ | 224.19 |
| $CaF_2$ | 60.06 |
| $MnNH_4PO_4$ | 27.34 |
| $NH_4Cl$ | 10.78 |

This mixture is heated in closed dishes for 4¾ hours at 700° C. in a furnace. The reaction product is then mixed with 19.97 grams of $Sb_4O_5Cl_2$. This mixture is thoroughly homogenized and subsequently heated in air at a temperature of 1140° C. for four hours. The reaction product thus obtained is ground and is then ready for use. The luminescent substance obtained emits white light having a color temperature of 4200° K. upon excitation by ultraviolent radiation having a wave length of 2537° A. In comparison with a corresponding substance obtained by adding the $Sb_4O_5Cl_2$ to the starting mixture and by firing this mixture for four hours at 1140° C., the former substance has a light output of 105%.

In similar fashion luminescent materials wherein the calcium is at least partially replaced by barium or strontium may also be produced.

What we claim is:
1. In the method of producing a luminescent trivalent alkaline earth halophosphate having an apatite structure and activated with trivalent antimony by introducing the antimony as antimony oxychloride, the improvement which comprises first forming the apatite structure, mixing the apatite with the antimony oxychloride and heating said mixture at a temperature between about 1000° C. and 1300° C.
2. The method of claim 1 wherein in addition that apatite structure is activated with bivalent manganese prior to the introduction of the antimony compound.

References Cited

UNITED STATES PATENTS 3,109,819   11/1963   Gillooly et al.

TOBIAS E. LEVOW, Primary Examiner
R. D. EDMONDS, Assistant Examiner

PO-1050
(5/69)

UNITED STATES PATENT OFFICE
CERTIFICATE OF CORRECTION

Patent No. 3,468,811 (PHN 1003)   Dated September 23, 1969

Inventor(s) JAN LOURENS OUWELTJES ET AL

It is certified that error appears in the above-identified patent and that said Letters Patent are hereby corrected as shown below:

Column 1, line 8, in the heading, "Aug.30,1965"

should read -- July 30, 1965 --.

Signed and sealed this 15th day of June     1971.

(SEAL)
Attest:

EDWARD M. FLETCHER, JR.                WILLIAM E. SCHUYLER, JR.
Attesting Officer                      Commissioner of Patents